United States Patent [19]

Donnelly

[11] 4,377,984

[45] Mar. 29, 1983

[54] CONNECTING ASSEMBLY FOR PIPE LINING EQUIPMENT

[75] Inventor: Frank Donnelly, Rockaway, N.J.

[73] Assignee: Spiniello Construction Company, Morristown, N.J.

[21] Appl. No.: 243,448

[22] Filed: Mar. 13, 1981

[51] Int. Cl.³ ................... B05C 7/08; B05C 11/04
[52] U.S. Cl. ........................ 118/105; 118/DIG. 10
[58] Field of Search ............... 118/105, 306, DIG. 10, 118/408; 15/104.05, 104.3 R; 425/460

[56] References Cited

U.S. PATENT DOCUMENTS

| 2,106,004 | 1/1938 | Inglee | 118/408 X |
| 3,368,253 | 2/1968 | Barton | 118/105 |
| 4,232,419 | 11/1980 | Sanger | 15/104.3 SN |

FOREIGN PATENT DOCUMENTS 471693  9/1937  United Kingdom ............... 118/306

*Primary Examiner*—Michael R. Lusignan

[57] ABSTRACT

An assembly for connecting pipe lining machine to a device to be pulled through a pipeline or the like is provided in which a coiled connector spring is attached between the device to be pulled through the pipe and the lining machine. A keeper member fixed to the connector is designed to be removably connected to a cement lining machine while permitting relative rotation thereof.

3 Claims, 4 Drawing Figures

CONNECTING ASSEMBLY FOR PIPE LINING EQUIPMENT

BACKGROUND OF THE INVENTION

In the refurbishment or repair of subterranean pipelines it is the common practice to coat the interior pipe walls with a coating of mortar. This is usually achieved by passing a rotating dispersion head through the pipe for spraying the mortar onto the interior pipe walls followed by a trowel which is concentrically located in the pipeline for engaging the mortar while still in a plastic condition to insure a uniform coating and a smooth exterior surface. When this equipment traverses through relatively long lengths of underground pipes, especially in connection with refurbishing existing pipelines, the equipment is usually operated by remote control through relatively long lengths of cable. This can cause the trowel to become oriented in an eccentric relation with the pipeline especially in connection with pipelines having relatively large angled bends. Also, the cable will tend to bind against the corner wall portion of a bend in a pipeline thus hindering the remote control operation and also damaging the newly applied mortar coating.

SUMMARY OF THE INVENTION

It is therefore an object of the present invention to provide a connecting assembly for connecting a rod to another device which minimizes the chances of the trowel becoming eccentric relative to the pipeline and the trowel binding in the pipeline.

It is still a further object of the present invention to provide an assembly of the above type in which the trowel is quick-detachably connected to the device.

It is still a further object of the present invention to provide an assembly of the above type in which the lining machine is allowed to rotate relative to the device during operation.

It is still a further object of the present invention to provide a connecting assembly of the above type in which the lining machine is connected to the device through one or two coiled springs to obtain flexibility.

Towards the fulfillment of these and other objects the assembly of the present invention includes a rod connected to the lining machine by means of a flexible connector and an enlarged head affixed to one end of the rod. A keeper member is provided which has an internal chamber and defines an enlarged access opening for receiving the head and a smaller access opening for receiving the rod so that the connector member can be inserted into the chamber through the openings and then moved relative to the keeper member to retain the connector member within the chamber. The keeper member is connected to the device by another flexible connector to complete the assembly.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENT

Figure 1:
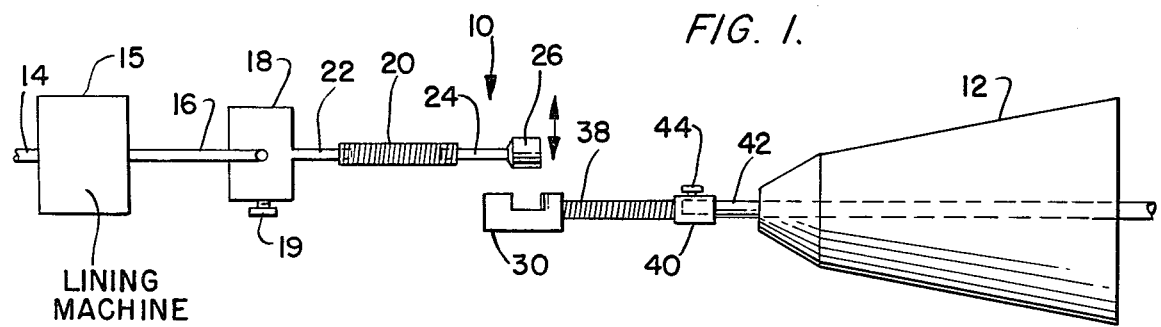
FIG. 1 is a side elevational view of the connecting assembly of the present invention.

Referring to FIG. 1 of the drawings, the reference numeral 10 refers in general to the connecting assembly of the present invention which is shown, for the purposes of example, connected between a generally frustoconically shaped trowel 12 and a pull cable 14. A lining machine 15, shown schematically for the convenience of presentation, is connected to the cable 14 and has a shaft 16 projecting therefrom which extends within a housing 18 and is secured thereto by a set screw 19. One end portion of a coiled spring 20 is found integral with a stub shaft 22 extending from the housing 18 and the other end of the spring 20 extends over one end portion of another rod 24 having an enlarged head member 26 affixed to its other end. The spring 20 can be affixed to the rod 24 in any known manner, such as by welding.

Figure 2:
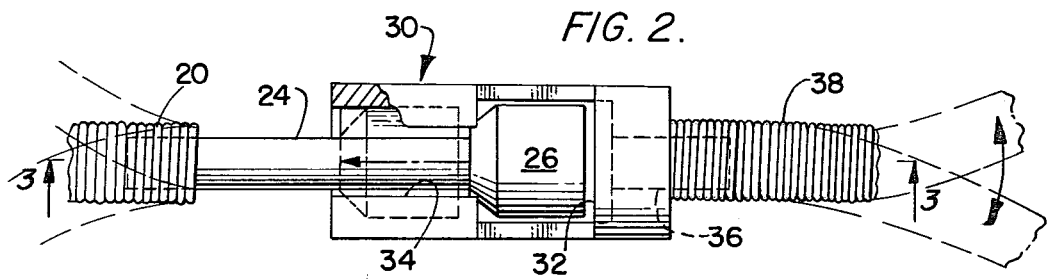
FIG. 2 is an enlarged plan view of a portion of the assembly of FIG. 1.
Figure 3:
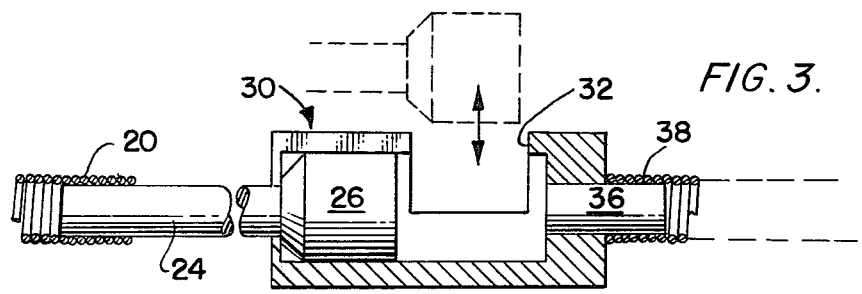
FIG. 3 is a cross-sectional view taken along the line 3—3 of FIG 2.

A keeper member 30 is provided for connecting with the rod 24 and the head member 26 and is better shown in FIG. 2. More particularly, the keeper member 30 is in the form of a hollow regular polyhedron having a relative large access opening 32 formed in its upper surface and a relative small access opening 34 extending through the same surface and in juxtaposition with the opening 32. The opening 32 is sized to receive the head member 26 and the opening 34 is sized to receive the rod 24. After insertion into the keeper member 30 in the manner shown in FIG. 2, the rod 24 and the head member 26 can be pulled relative to the keeper member 30 in a direction from right to left as viewed in FIG. 2, whereby the head member 26 slides to the position within the keeper member 30 shown in FIG. 3, that is, immediately below the access opening 34 to constrain the head member within the keeper member when forces are applied to the cable 14 in a longitudinal direction.

A rod 36 is secured within an end wall of the keeper member 30, and one end of an additional coiled spring 38 is secured over the rod 36. Referring again to FIG. 1, the other end of the spring 38 is connected to a retainer member 40 to which a rod 42 extending from the trowel 12 is quick-releasably secured. A set screw 44 extends through an opening formed in the retainer member 40 in threaded engagement therewith and is adapted to engage the rod 42 to retain it in the position shown. The rod 42 extends through the trowel and projects therefrom for connection to other apparatuses, such as another trowel.

Figure 4:
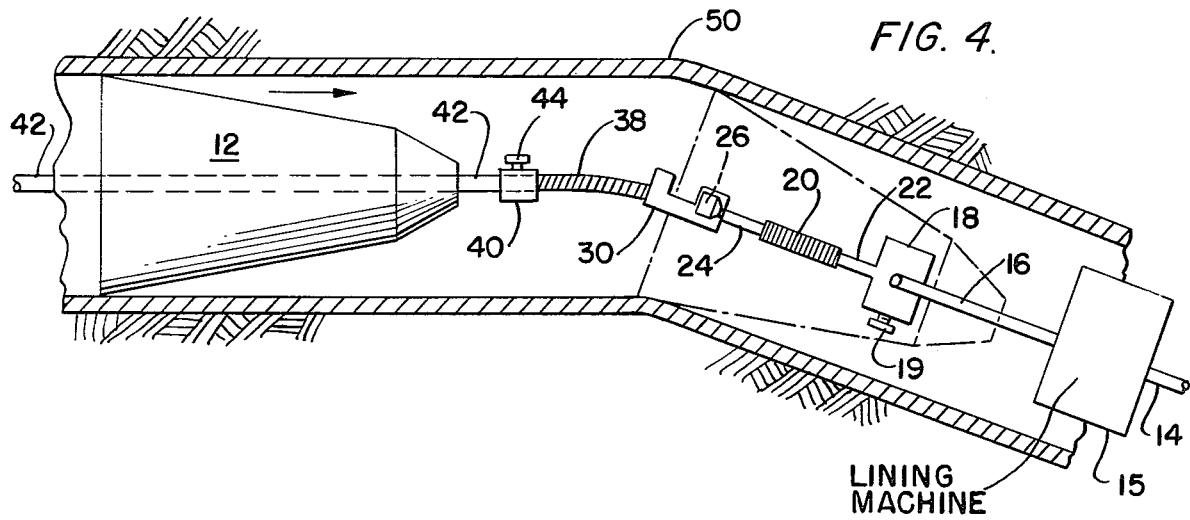
FIG. 4 is a front elevational view showing the assembly of the present invention installed in a pipeline.

The assembly 10 of the present invention is shown installed in a pipe 50 in FIG. 4. As is clear from the drawing, the assembly 10 is located substantially coextensive with the centerline of the pipe 50, and maintains the frustoconical portion of the trowel 12 in a similar orientation even when the assembly 10 and the trowel 12 pass around bends in the pipe 50 similar to the one shown in the drawing. This is especially important since it will insure that a uniform coating of mortar from the lining machine 15 can be smoothed by the trowel 12 coaxial with the internal wall of the pipeline even when the latter is bent or curved which would otherwise cause the trowel to move off center. In addition the assembly of the present invention prevents binding of the trowel in the pipeline and permits relative rotation between the lining machine 15 and the trowel 12 during use and quick connection and disconnection of the lining machine 15 with the trowel 12.

It is understood that the assembly of the present invention is not limited to use in the specific environment discussed above but can be used to connect a cable, or the like, to any other device for pullng the latter through a pipeline or the like.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. Apparatus connecting a device to be pulled through a pipeline to a pipe lining machine which is attached to a cable for pulling said machine through said pipe, said apparatus comprising a first coiled spring, means for connecting one end of said first coiled spring to said pipe lining machine, a second coiled spring, means for connecting one end of said second coiled spring to said device, and means for quick-detachably connecting the other ends of said coiled springs to each other.

2. The apparatus of claim 1 wherein said connecting means comprises a keeper member attached to the other end of one of said second coiled spring and a connector member attached to the other end of the first coiled spring and adapted to be inserted in said keeper member to provide said connection, such that the coiled springs are maintained in solid alignment without angular movement therebetween.

3. The apparatus of claim 2 in which a first rod extends from the lining machine, an enlarged head is integrally formed at the end of said rod and attached to one end of said first spring. and said keeper member having an internal chamber defining an enlarged access opening for receiving said connector member and a smaller access opening for receiving a second rod so that said connector member can be inserted into said chamber through said opening and then moved relative to said keeper member so that said connector member extends underneath said smaller access opening and thus retains said connector member within said chamber.

* * * * *